(12) United States Patent
Yamaguchi et al.

(10) Patent No.: US 10,538,662 B2
(45) Date of Patent: Jan. 21, 2020

(54) POLYLACTIC ACID RESIN COMPOSITION AND METHOD FOR PRODUCING SAME

(71) Applicant: Hitachi Zosen Corporation, Osaka-shi, Osaka (JP)

(72) Inventors: Shuhei Yamaguchi, Osaka (JP); Shinya Takeno, Osaka (JP)

(73) Assignee: HITACHI ZOSEN CORPORATION, Osaka-Shi, Osaka (JP)

( * ) Notice: Subject to any disclaimer, the term of this patent is extended or adjusted under 35 U.S.C. 154(b) by 24 days.

(21) Appl. No.: 16/065,385

(22) PCT Filed: Sep. 14, 2016

(86) PCT No.: PCT/JP2016/077106
§ 371 (c)(1),
(2) Date: Jun. 22, 2018

(87) PCT Pub. No.: WO2017/110164
PCT Pub. Date: Jun. 29, 2017

(65) Prior Publication Data
US 2018/0371234 A1 Dec. 27, 2018

(30) Foreign Application Priority Data
Dec. 24, 2015 (JP) ................................ 2015-252599

(51) Int. Cl.
| | | |
|---|---|---|
| *C08L 67/04* | (2006.01) | |
| *C08L 47/00* | (2006.01) | |
| *C08K 5/14* | (2006.01) | |

(52) U.S. Cl.
CPC .............. *C08L 67/04* (2013.01); *C08K 5/14* (2013.01); *C08L 47/00* (2013.01); *C08K 2201/003* (2013.01); *C08L 2312/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,759,569 | A * | 6/1998 | Hird | A61L 15/30 424/443 |
| 2010/0016495 | A1 * | 1/2010 | Taniguchi | C08J 3/24 524/502 |
| 2011/0003958 | A1 | 1/2011 | Nakazawa et al. | |
| 2013/0310519 | A1 * | 11/2013 | Tanaka | C08B 15/00 525/54.22 |
| 2016/0083754 | A1 * | 3/2016 | Medoff | C12P 19/02 435/121 |

FOREIGN PATENT DOCUMENTS

| | | |
|---|---|---|
| DE | 10 2011 012 869 A1 | 9/2012 |
| JP | 2009-221306 A | 10/2009 |
| JP | 2011-241317 A | 12/2011 |
| JP | 2012-107137 A | 6/2012 |
| JP | 2012-219112 A | 11/2012 |
| JP | 2012-219151 A | 11/2012 |
| JP | 2014-231552 A | 12/2014 |
| JP | 2015-63645 A | 4/2015 |
| WO | 2008/026632 A1 | 3/2008 |
| WO | 2014/148226 A1 | 9/2014 |

OTHER PUBLICATIONS

International Search Report for PCT/JP2016/077106 dated Dec. 6, 2016.
Chen et al., "Dynamically Vulcanized Biobased Polylactide/Natural Rubber Blend Material with Continuous Cross-Linked Rubber Phase," ACS Applied Materials & Interfaces, 2014, pp. 3811-3816.
Nakamura, "Organic Peroxides as Crosslinking Agents", NOF Corporation, Functional Chemicals & Polymers Research Laboratory 82, Jun. 18, 2019.
Organic Peroxides, Functional Chemicals and Polymers Devision of NOF Corp,, 10th Edition, Nov. 2004, pp. 1-5 and 1-6.
WPI Database, XP-002792673, AN 2014-J12333, Clarivate Analytics, 2017.

\* cited by examiner

*Primary Examiner* — Christopher M Rodd
(74) *Attorney, Agent, or Firm* — Pearne & Gordon LLP

(57) ABSTRACT

A polylactic acid resin composition of the present invention is constructed by dynamically cross-linking a resin mixture containing a polylactic acid-based resin, trans-polyisoprene, and a cross-linking agent. The resin composition can be used for a wide variety of applications such as automobile molded articles, molded articles for electric products, molded articles for agricultural materials, molded articles for business use, and molded articles for daily use.

10 Claims, 1 Drawing Sheet

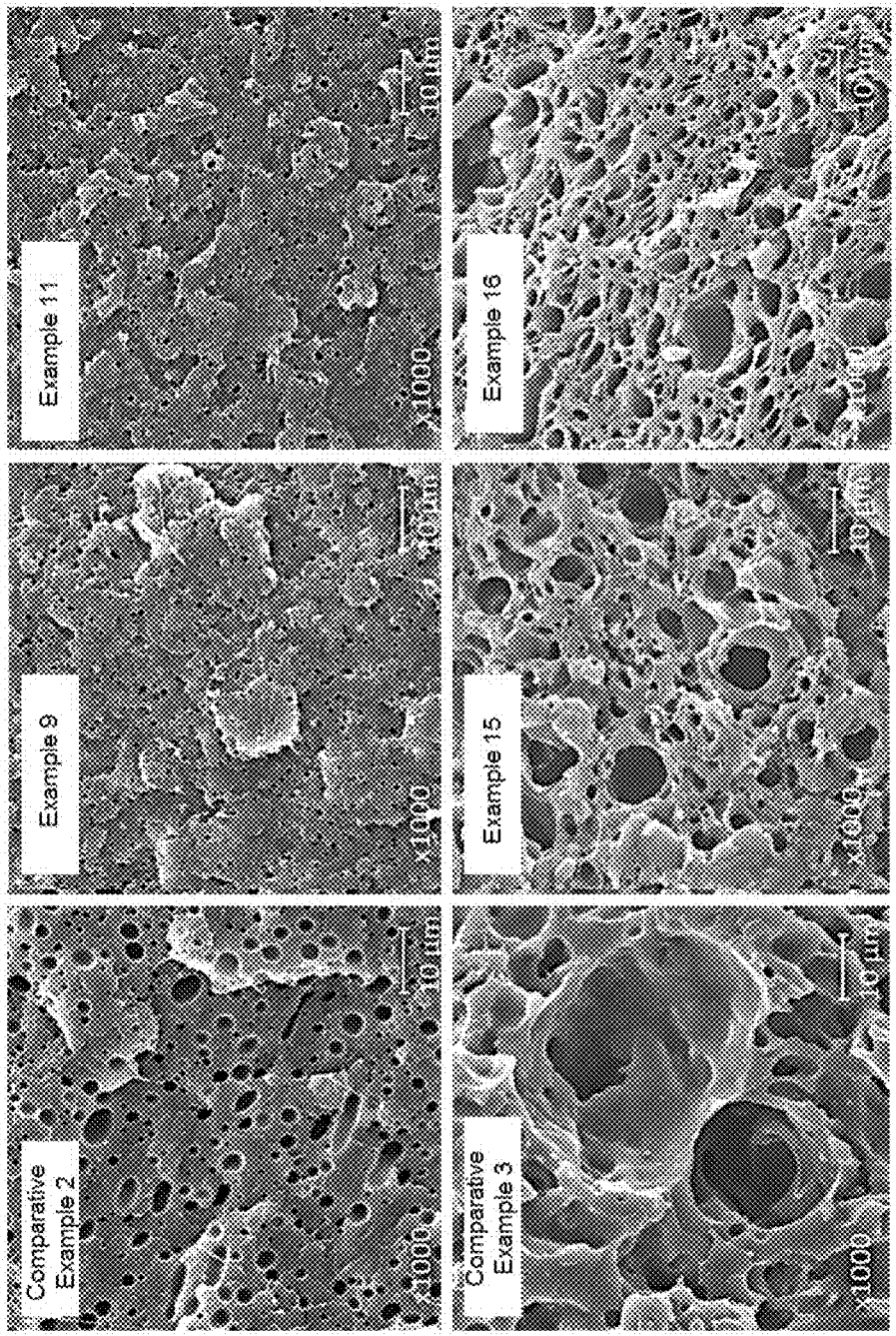

POLYLACTIC ACID RESIN COMPOSITION AND METHOD FOR PRODUCING SAME

TECHNICAL FIELD

The present invention relates to a polylactic acid resin composition and a method for producing the same, and more particularly relates to a polylactic acid resin composition having improved impact resistance and flexibility, and a method for producing the same.

BACKGROUND ART

Conventionally, polylactic acid, which is one of bioplastics, has been widely used in various fields such as the fields of medical materials and agricultural materials. However, the use of polylactic acid itself is limited due to its low impact resistance and flexibility, and it is desired to improve the use as a resin composition in combination with an additive. For example, in order to be used for automobile parts, members of household electric products, and the like, polylactic acid is required to have thermoplasticity, as well as improved impact resistance and flexibility.

Meanwhile, the copolymerization and the alloying of polylactic acid, and the use of an additive such as rubber have been employed to improve the impact resistance and the flexibility of polylactic acid. However, most of the products used for these purposes are derived from petroleum, thus compromising the feature of polylactic acid that it is derived from biomass.

In this respect, examples of a case where the impact resistance and the flexibility of polylactic acid have been improved by using a biomass-derived material include the production of a composite material of polylactic acid and natural rubber.

For example, Patent Documents 1 and 2 disclose resin compositions containing polylactic acid, natural rubber such as epoxidized natural rubber, and a carbodiimide compound. For the resin compositions of Patent Documents 1 and 2, it is described that the impact resistance has been improved by cross-linking the carbodiimide compound and the natural rubber. However, there is a concern that carbodiimide compounds may generate isocyanate gas during melt kneading or molding, resulting in a deterioration of the working environment. Further, the carbodiimide compounds used for these purposes are reagents that are generally not easily available, for example, in that they need to be set to have a predetermined molecular weight, and, therefore, it can be hardly said that they are suitable for industrial production.

In addition, Non-Patent Document 1 discloses that dynamically cross-linking of polylactic acid and natural rubber in a kneading device has improved the impact resistance of the resulting polylactic acid resin composition. However, for the polylactic acid resin composition, the natural rubber is added in excess in order to improve the impact resistance. Accordingly, it is inevitable that the mechanical properties of the polylactic acid itself are compromised. Further, there is also a concern that the natural rubber added may reduce the aesthetic properties of the resin molded article due to unnecessary coloration, or may cause latex allergy to the user.

CITATION LIST

Patent Documents

[Patent Document 1] Japanese Patent Laid-Open publication No. 2012-219151

[Patent Document 2] Japanese Patent Laid-Open publication No. 2011-241317

Non Patent Documents

[Non-Patent Document 1] Yukun Chen et al., "Dynamically Vulcanized Biobased Polylactide/Natural Rubber Blend Material with Continuous Cross-Linked Rubber Phase", ACS Appl. Mater. Interfaces 2014, 6, 3811-3816

SUMMARY OF INVENTION

Problem to be Solved by Invention

The present invention is to solve the above-described problems, and an object thereof is to provide a polylactic acid resin composition whose impact resistance and flexibility can be improved by using a biomass-derived material instead of natural rubber, and a method for producing the same.

Means for Solving Problem

The present invention provides a polylactic acid resin composition constructed by dynamically cross-linking a resin mixture containing a polylactic acid-based resin, trans-polyisoprene, and a cross-linking agent.

In one embodiment, when a content of the trans-polyisoprene is taken as 100 parts by mass, a content of the polylactic acid-based resin is 80 parts by mass to 2000 parts by mass, and a content of the cross-linking agent is 0.3 parts by mass to 50 parts by mass.

In one embodiment, the cross-linking agent is an organic peroxide.

In one embodiment, the organic peroxide is at least one peroxide selected from the group consisting of 2,5-dimethyl-2,5-di(t-butylperoxy)hexane, dicumyl peroxide, and 2,5-dimethyl-2,5-di(t-butylperoxy)-3-hexyne.

In one embodiment, the trans-polyisoprene is contained in a form of particles having an average particle diameter of 0.1 µm to 100 µm.

The present invention also provides a method for producing a polylactic acid resin composition, comprising:

mixing a polylactic acid-based resin, trans-polyisoprene, and a cross-linking agent to obtain a resin mixture; and kneading the resin mixture under heating to dynamically cross-link the resin mixture.

In one embodiment, the step of kneading is performed at a temperature of 80° C. to 280° C.

In one embodiment, when a content of the trans-polyisoprene is taken as 100 parts by mass, a content of the polylactic acid-based resin is 80 parts by mass to 2000 parts by mass, and a content of the cross-linking agent is 0.3 parts by mass to 50 parts by mass.

In one embodiment, the cross-linking agent is an organic peroxide.

The present invention also provides a resin molded article containing the above polylactic acid resin composition.

Effects of Invention

According to the present invention, it is possible to provide a resin composition having improved impact resistance and flexibility as compared with polylactic acid. The polylactic acid resin composition of the present invention has thermoplasticity, and thus can also provide a wide variety of resin molded articles. Further, the polylactic acid resin composition of the present invention can use, as a component, a biomass-derived material that is easily available, thus better enabling its application to industrial production processes.

BRIEF DESCRIPTION OF DRAWING

FIG. 1 shows enlarged electron micrographs of the fracture surfaces of strip pieces produced for Charpy impact tests for resin samples obtained in Examples 9, 11, 15 and 16, and Comparative Examples 2 and 3.

MODES FOR CARRYING OUT THE INVENTION

Hereinafter, the present invention will be described in detail.

(Polylactic Acid Resin Composition)

A polylactic acid resin composition according to the present invention is constructed by dynamically cross-linking a resin mixture containing a polylactic acid resin, trans-polyisoprene, and a cross-linking agent.

The polylactic acid-based resin included in the resin composition of the present invention collectively refers to polylactic acid-based resins having biodegradability (e.g., a property of being degradable, for example, by action of microorganisms under various environments in the natural world, such as in soil, in compost, in fresh water, or in seawater). Examples of the polylactic acid-based resin include polymers and copolymers containing L-lactic acid and/or D-lactic acid as a monomer unit, and copolymers of L-lactic acid and/or D-lactic acid as a monomer unit with another organic acid such as glycolic acid, 3-hydroxybutyric acid, 4-hydroxybutyric acid, 4-hydroxy valeric acid, 5-hydroxy valeric acid, 6-hydroxy caproic acid as another monomer unit; and/or another alcohol such as vinyl alcohol and butane diol. When the other monomer unit is contained in the polylactic acid-based resin, the other monomer unit is contained in the ratio of preferably 50 mol % or less, and more preferably in the ratio of 0.1 mol % to 50 mol %. In the present invention, for the reason of being highly versatile and readily available, the polylactic acid-based resin is preferably poly(L-lactic acid) including L-lactic acid as a monomer unit.

Further, the weight-average molecular weight of the polylactic acid-based resin according to the present invention is preferably 10,000 to 1,000,000, and more preferably 50,000 to 500,000. When the weight-average molecular weight of the polylactic acid-based resin is less than 10,000, the mechanical properties of the resulting polylactic acid resin composition may be reduced, thus impairing the versatility as the resin molded article. When the weight-average molecular weight of polylactic acid-based resin exceeds 1,000,000, the moldability of the resulting polylactic acid resin composition may be reduced.

The polylactic acid resin composition may be, for example, obtained through ring-opening polymerization of lactide or dehydration condensation of L- and/or D-lactic acid, or may be obtained by polymerizing, under heating, L- and/or D-lactic acid in a predetermined organic solvent such as diphenyl ether under reduced pressure. Alternatively, the polylactic acid resin composition may be produced from biomass using a method known to those skilled in the art. Examples of the biomass include, but are not necessarily limited to, plant materials such as corn, sweet potato, potato, and sugarcane, and combinations thereof.

The content of the polylactic acid-based resin in the resin composition of the present invention may be preferably set relative to the content of the trans-polyisoprene as a reference, which will be described below. In the present invention, for example, when the content of the trans-polyisoprene is taken as 100 parts by mass, the content of the polylactic acid-based resin is preferably 80 parts by mass to 2000 parts by mass, and more preferably 90 parts by mass to 950 parts by mass. When the content of the polylactic acid-based resin is less than 80 parts by mass relative to the above-described reference, the amount of the polylactic acid-based resin contained in the resulting resin composition will become relatively low as compared with the amounts of the other components, which may result in a deviation from the purpose of providing a polylactic acid resin composition that is biomass-derived and has excellent biodegradability. When the content of the polylactic acid-based resin exceeds 2000 parts by mass relative to the above-described reference, the amount of the polylactic acid-based resin contained in the resulting resin composition will become relatively large as compared with the amounts of the other components, and, therefore, the resin composition may exhibit undesirable properties (e.g., reduced impact resistance and flexibility) of the polylactic acid-based resin.

In the polylactic acid resin composition of the present invention, the trans-polyisoprene may be, for example, a biomass-derived trans-polyisoprene, a chemically synthesized trans-polyisoprene, or a combination thereof. In particular, for the reason of being a non-petroleum-based material and readily available, the trans-polyisoprene is preferably a polyisoprene obtained from a material derived from biomass. It should be noted that the polyisoprene obtained from a material derived from biomass includes trans-polyisoprene and cis-polyisoprene. However, in the present invention, the polyisoprene obtained from a material derived from biomass may contain, in addition to trans-polyisoprene, cis-polyisoprene within the range that does not affect the effect of the polylactic acid resin composition that can be provided by the trans-polyisoprene itself. Further, in the present invention, the trans-polyisoprene may be a trans-polyisoprene that has been chemically modified with a maleic anhydride group, a maleimide group, an epoxy group, or the like, as appropriate.

Examples of the biomass containing polyisoprene include a plant tissue composed of the root, stem (trunk), leaf, samara (pericarp and seed), and bark of a plant body, or a combination thereof. Examples of the plant body for providing these plant tissues include, but are not necessarily limited to, *Eucommia* (*Eucommia ulmoides* Oliver), gutta-percha (*Palaquim gutta*), and Baratagomunoki (*Mimusops balata*). In the present invention, for the reason of being able to obtain trans-polyisoprene having a high weight-average molecular weight, and also having, in its structure, a high percentage content of trans-1,4-bond unit and a low percentage content of a bond isomer unit, it is preferable to use trans-polyisoprene derived from *Eucommia*. The trans-polyisoprene can be obtained, for example, using a method known in the relevant technical field by using a crushed body and/or a cut powder body of a dried product or a non-dried product of the above-described plant tissue.

When the trans-polyisoprene is derived from *Eucommia*, for example, the number-average mean molecular weight (Mn) of the trans-polyisoprene of the present invention is, but is not necessarily limited to, preferably 10,000 to 1,500, 000, more preferably 50,000 to 1,500,000, and even more preferably 100,000 to 1,500,000.

Alternatively, when the trans-polyisoprene is derived from *Eucommia*, for example, the weight-average molecular weight (Mw) of the trans-polyisoprene of the present invention is, but is not necessarily limited to, preferably $1 \times 10^3$ to $5 \times 10^6$, more preferably $1 \times 10^4$ to $5 \times 10^6$, and even more preferably $1 \times 10^5$ to $5 \times 10^6$.

In the present invention, the trans-polyisoprene preferably has the form of particles, and is present in a state in which the trans-polyisoprene forms a sea-island structure finely dispersed in the matrix of the polylactic acid-based resin. The average particle diameter of the trans-polyisoprene having such a form of particles is preferably 0.1 μm to 100 μm, and more preferably 0.1 μm to 10 μm. When the trans-polyisoprene constitutes particles that satisfy such an average particle diameter range, the impact resistance and the flexibility of the polylactic acid resin composition of the present invention including the polyisoprene are improved. The average particle diameter of such trans-polyisoprene can be calculated, for example, by etching a cross section of a sample piece constituted by the obtained polylactic acid resin composition with a solvent such as n-hexane to remove the trans-polyisoprene particles present in the cross section, and surface-treating the resultant pores (corresponding to the particle diameter of the trans-polyisoprene contained in the poly resin composition) using a sputtering method such as gold evaporation, followed by measuring the radius of the surface-treated pores through the angle of visibility of an electron micrograph.

In the polylactic acid resin composition of the present invention, the cross-linking agent is formulated as a resin mixture together with the above-described polylactic acid-based resin and trans-polyisoprene. By dynamically cross-linking such a resin mixture, it is possible to impart better physical properties (e.g., impact resistance and flexibility) to the resulting resin composition as compared with those of a non-cross-linked composition.

In the present invention, examples of the cross-linking agent include organic peroxides (e.g., 2,5-dimethyl-2,5-di(t-butylperoxy)hexane, dicumyl peroxide, and 2,5-dimethyl-2,5-di(t-butylperoxy)-3-hexyne, and combinations thereof); sulfur; organic sulfur compounds; organic nitroso compounds (e.g., aromatic nitroso compounds); oxime compounds; metal oxides (e.g., zinc oxide and magnesium oxide, and combinations thereof); polyamines; semimetals and compounds thereof (e.g., semimetals such as selenium and tellurium, and compounds thereof, and combinations thereof); resin cross-linking agents (e.g., alkylphenol formaldehyde resin and brominated alkylphenol formaldehyde resin, and combinations thereof); organic organosiloxane compounds having two or more SiH groups in the molecule; and combinations thereof. In the present invention, it is preferable to use an organic peroxide as the cross-linking agent, for example, for the reason of preventing the reduction in the mechanical properties of the resin composition itself caused by the degradation of the polylactic acid-based resin and the trans-polyisoprene during cross-linking; not requiring a special large facility for cross-linking; and being readily available as a reagent and a material for industrial production.

The content of the cross-linking agent in the resin composition of the present invention is preferably set relative to the above-described trans-polyisoprene content as a reference. In the present invention, for example, when the content of the trans-polyisoprene is taken as 100 parts by mass, the content of the cross-linking agent is preferably 0.3 parts by mass to 50 parts by mass, more preferably 2.8 parts by mass to 48 parts by mass, and even more preferably 4 parts by mass to 45 parts by mass. When the content of the cross-linking agent is less than 0.3 parts by mass relative to the above-described reference, it is difficult to cause appropriate dynamic cross-linking in the resulting resin composition, so that it may not be possible to provide satisfactory impact resistance and flexibility. When the content of the cross-linking agent exceeds 50 parts by mass relative to the above-described reference, the dynamic cross-link formed in the resulting resin composition becomes the so-called excessive cross-link and firmly binds the constituent molecules, so that the moldability of the resin composition itself may be degraded.

The polylactic acid resin composition of the present invention may further contain other additive materials as needed. Examples of the other additive materials include a filler, a crystal nucleating agent, a plasticizer, a vulcanization accelerator, an antioxidant and a flexibility imparting agent, and combinations thereof. Here, examples of the filler include, but are not particularly limited to, cellulose powder, carbon black, silica, talc and titanium oxide, and combinations thereof. The crystal nucleating agent is not particularly limited as long as it can accelerate the crystallization of the above-described polylactic acid-based resin, and either an inorganic or organic crystal nucleating agent may be used. The crystal nucleating agent is preferably an organic crystal nucleating agent. More preferable examples thereof include homopolymers containing lactic acid (unit) having a chirality different from that of the above-described polylactic acid-based resin as a monomer unit, and copolymers containing the lactic acid unit and another monomer unit (e.g., polysaccharides such as starch and glucomannan; monosaccharides such as glucose; disaccharides such as sucrose and maltose; and oligosaccharides such as cyclodextrin). The plasticizer, the vulcanization accelerator, and the antioxidant are not particularly limited, and commercially available products thereof may be used, for example. Examples of the flexibility imparting agent include, but are not particularly limited to, polycaprolactone.

The contents of the other additive materials in the composition of the present invention are not particularly limited, and any amount may be selected by those skilled in the art, taking into consideration the above-described contents of the polylactic acid-based resin, the trans-polyisoprene, and the cross-linking agent.

The polylactic acid resin composition of the present invention is constructed by dynamically cross-linking a resin mixture containing the polylactic acid-based resin, the trans-polyisoprene, and the cross-linking agent, as well as the other additive materials included as needed.

Here, the term "dynamic cross-linking" as used herein refers to cross-linking between trans-polyisoprene and a cross-linking agent, obtained by kneading a resin mixture, wherein the cross-linked trans-polyisoprene is finely dispersed in the resin composition by the shearing force applied during kneading. Such dynamic cross-linking in the resin composition can be readily modified by those skilled in the art, for example, by varying the conditions in a step of kneading, which will be described below.

The polylactic acid resin composition of the present invention has a sea-island structure in which the trans-polyisoprene is finely dispersed in the matrix of the polylactic acid-based resin, and has improved impact resistance and flexibility as compared with those provided by the polylactic acid-based resin alone. Consequently, the polylactic acid resin composition of the present invention can be used for various resin molded articles (e.g., automobile molded articles, molded articles for electric products, molded articles for agricultural materials, molded articles for business use, and molded articles for daily use) which have been difficult to be provided by using conventional polylactic acid-based resin alone for the reason of a lack of impact resistance or the like.

(Method for Producing Polylactic Acid Resin Composition)

In production of the polylactic acid resin composition of the present invention, first, the above-described polylactic acid-based resin, trans-polyisoprene, and cross-linking agent, as well as the above-described other additive materials as needed, are mixed, to form a resin mixture.

In obtaining the resin mixture, the polylactic acid-based resin, the trans-polyisoprene, the cross-linking agent, and the other additive materials may be mixed in various orders. In one embodiment, the polylactic acid-based resin and the trans-polyisoprene may be mixed and kneaded at a predetermined temperature in advance, followed by adding the cross-linking agent to the kneaded material, to form a resin mixture (it should be noted that in this case, the other additive materials may be added after the kneading performed using a kneading device, which will be described below). Alternatively, in another embodiment, the resin mixture may be formed by temporarily introducing the polylactic acid resin, the trans-polyisoprene, the cross-linking agent, and the other additive material directly into a kneading device, as the one that will be described below, or may be temporarily mixed in another container.

Then, the resin mixture is kneaded under heating.

Various kneading devices may be used for kneading. Examples of the kneading device include, but are not particularly limited to, a segment mixer, a Banbury mixer, a Brabender mixer, a pressurized kneader, a single-screw extruder, a twin-screw extruder, and an open roll.

The temperature required for kneading may be set to any temperature by those skilled in the art, taking into consideration the melting point of the polylactic acid-based resin used and/or the degradation starting temperature of the trans-polyisoprene. The temperature at which the resin mixture is subjected to kneading is preferably 80° C. to 280° C., more preferably 100° C. to 250° C., and even more preferably 120° C. to 180° C. When the temperature at which the resin mixture is subjected to kneading is less than 80° C., the dynamic cross-linking of the resin mixture becomes insufficient, so that the impact resistance and the flexibility of the resulting resin composition may not be improved very much as compared with those provided by the polylactic acid-based resin alone. When the temperature at which the resin mixture is subjected to kneading exceeds 280° C., the molecular weight of the polylactic acid-based resin and/or the trans-polyisoprene is decreased, so that the mechanical properties of the resulting resin composition may be reduced.

The time required for kneading is not necessarily limited because it may vary depending on the total amount of the resin mixture used, and the content ratio of the polylactic acid-based resin, the trans-polyisoprene, and the cross-linking agent as well as the other additive materials contained in the resin mixture, and may be set to any time by those skilled in the art. The time required for kneading is preferably 3 minutes to 60 minutes, and more preferably 5 minutes to 30 minutes. When the time required for kneading is less than 3 minutes, the dynamic cross-linking in the resin mixture becomes insufficient, so that the impact resistance and the flexibility of the resulting resin composition may not be improved very much as compared with those provided by the polylactic acid-based resin alone. When the time required for kneading exceeds 60 minutes, the molecular chain of the polylactic acid-based resin and/or the trans-polyisoprene in the resin mixture may break down, thus reducing the mechanical properties of the resulting resin composition.

Through the above-described kneading, the resin mixture is dynamically cross-linked, thus making it possible to obtain a resin composition having a sea-island structure composed of a trans-polyisoprene component-dispersed phase and a polylactic acid component matrix phase.

Thus, the polylactic acid resin composition of the present invention is produced.

A feature of the polylactic acid resin compostion of the present invention lies in that it has thermoplasticity due to the polylactic acid-based resin, which is a component, even though the trans-polyisoprene component has been cross-linked. Accordingly, the polylactic acid resin composition of the present invention can be molded into any resin molded article using a known molding method for thermoplastic resin, such as extrusion molding, injection molding, blow molding, and compression molding and by using a molding device that employs such a known method. In addition, the thus obtained resin molded article can also be remolded.

EXAMPLES

Hereinafter, the present invention will be described in further detail by way of examples. However, the present invention is not limited to these examples.

Example 1

Into a Labo Plastomill (kneader) including a segment mixer whose temperature had been adjusted to 150±10° C., 38 g of a pellet of polylactic acid (manufactured by UNITIKA LTD., TERRAMAC TE-2000) and 2 g of *Eucommia*-derived (*Eucommia ulmoides Oliver*-derived) trans-polyisoprene (manufactured by Hitachi Zosen Corporation, *Eucommia* Elastomer (registered trademark)) were introduced, and the whole was melt-kneaded at 50 rpm for 3 minutes.

Then, 0.03 g of dicumyl peroxide (DCP) (manufactured by KISHIDA CHEMICAL Co., Ltd.) was introduced as a cross-linking agent into the kneaded material obtained as above, and the whole was further melt-kneaded at 50 rpm for 6 minutes, thus obtaining a dynamically cross-linked resin composition. Thereafter, 0.08 g of 4,6-bis(octylthiomethyl)-o-cresol (manufactured by BASF) was introduced as an antioxidant, and the whole was kneaded at 50 rpm for 1 minute, to obtain a polylactic acid resin sample.

For the polylactic acid resin sample, the impact strength in accordance with the following Charpy impact test was measured, and the biomass degree was calculated.

(Impact Strength; Charpy Impact Test)

The polylactic acid resin sample obtained as above was cut into a fine piece, and a Charpy impact test strip piece (80×10×4 mm) was molded using a small-sized injection molding machine (manufactured by Thermo Fisher Scientific K.K./Model: HAAKE MiniJet Pro). The test strip was subjected to processing for forming a single notch using a notching tool (manufactured by Toyo Seiki Seisaku-sho, Ltd.). As the Charpy impact test, a test compliant with JIS K 7111-1 was performed using an impact tester (manufactured by Toyo Seiki Seisaku-sho, Ltd.).

The obtained result of the Charpy impact test is shown in Table 1.

(Biomass Degree)

The biomass degree of the obtained polylactic acid resin sample was calculated in accordance with the following expression:

$$\text{Biomass Degree (\%)} = \frac{\text{Biomass-derived component mass (g)}}{\text{Total compositional mass (g)}} \times 100 \quad \text{[Formula 1]}$$

(Here, "Biomass-derived component mass" in the polylactic acid resin sample of the present example is a total mass of the polylactic acid and the trans-polyisoprene used, and "Total compositional weight" is a total mass of the polylactic acid, the trans-polyisoprene, the antioxidant, and the organic peroxide that were introduced).

The biomass degree of the polylactic acid resin sample obtained in the present example was 99.7% or more.

The obtained result is shown in Table 1.

Examples 2 to 7

Polylactic acid resin samples were produced in the same manner as in Example 1 except that the amount of the cross-linking agent used in Example 1 was changed to each of the amounts shown in Table 1, and the impact strength and the biomass degree of the obtained polylactic acid resin samples were evaluated in the same manner as in Example 1. The obtained results are shown in Table 1.

Comparative Example 1

The impact strength and the biomass degree of 40 g of a pellet of polylactic acid (manufactured by UNITIKA LTD., TERRAMAC TE-2000), in place of the polylactic acid resin sample obtained in Example 1, were evaluated in the same manner as in Example 1. Further, the sample obtained in the present comparative example was cut into a fine piece, and a dumbbell test strip type 1BA was then produced using a small-sized injection molding machine (manufactured by Thermo Fisher Scientific K.K./Model: HAAKE MiniJet Pro). This was subjected to a test compliant with JIS K 7161 using a universal material tester (manufactured by SHIMADZU CORPORATION, Autograph AGX-plus), thus measuring the tensile modulus (MPa) of the sample. The obtained results are shown in Table 1.

As shown in Table 1, as compared with the sample of Comparative Example 1, for which the polylactic acid was used alone, the polylactic acid resin samples obtained in Examples 1 to 7 had a better impact strength although there was not a significant difference in the biomass degree. In particular, the larger the content of the cross-linking agent, the more significant the increase in the impact strength of the resultant polylactic acid resin sample was prone to be. From this, it can be seen that the polylactic acid resin samples obtained in Examples 1 to 7 have been improved in impact resistance as compared with the polylactic acid (Comparative Example 1).

Examples 8 to 14

Polylactic acid resin samples were produced in the same manner as in Example 1 except that the amounts of the polylactic acid, the trans-polyisoprene, and the cross-linking agent used in Example 1 were changed to the amounts shown in Table 2, and the impact strength, the tensile modulus, and the biomass degree of the obtained polylactic acid resin samples were evaluated in the same manner as in Example 1 and Comparative Example 1. The obtained results are shown in Table 2, together with the results obtained in Comparative Example 1.

Comparative Example 2

A polylactic acid resin sample was produced in the same manner as in Example 1 except that the amounts of the polylactic acid and the trans-polyisoprene used in Example 1 were changed to the amounts shown in Table 2, and that the cross-linking agent was not introduced, and the impact strength, the tensile modulus, and the biomass degree of the obtained polylactic acid resin sample were evaluated in the same manner as in Example 1 and Comparative Example 1. The obtained results are shown in Table 2.

TABLE 1

|  |  | Comparative Example 1 | Example 1 | Example 2 | Example 3 | Example 4 | Example 5 | Example 6 | Example 7 |
|---|---|---|---|---|---|---|---|---|---|
| Polylactic acid | g | 40 | 38 | 38 | 38 | 38 | 38 | 38 | 38 |
|  | Parts by mass[1] | — | 1900 | 1900 | 1900 | 1900 | 1900 | 1900 | 1900 |
| Trans-polyisoprene | g | 0 | 2 | 2 | 2 | 2 | 2 | 2 | 2 |
| Cross-linking agent | g | 0 | 0.03 | 0.09 | 0.15 | 0.33 | 0.51 | 0.69 | 0.87 |
|  | Parts by mass[1] | — | 1.5 | 4.5 | 7.5 | 16.5 | 25.5 | 34.5 | 43.5 |
| Antioxidant | g | — | 0.08 | 0.08 | 0.08 | 0.08 | 0.08 | 0.08 | 0.08 |
| Impact strength | kJ/m$^2$ | 1.5 | 2.6 | 2.6 | 3.2 | 3.4 | 7.0 | 15.0 | 15.6 |
| Tensile modulus | MPa | 2806 | — | — | — | — | — | — | — |
| Biomass degree | % | 100 | 99.7 | 99.5 | 99.4 | 99.0 | 98.5 | 998.1 | 97.7 |

[1]Parts by mass, when a content of the trans-polyisoprene is taken as 100 parts by mass, is represented by rounding off one decimal place.

TABLE 2

|  |  | Comparative Example 1 | Comparative Example 2 | Example 8 | Example 9 | Example 10 | Example 11 | Example 12 | Example 13 | Example 14 |
|---|---|---|---|---|---|---|---|---|---|---|
| Polylactic acid | g | 40 | 36 | 36 | 36 | 36 | 36 | 36 | 36 | 36 |
|  | Parts by mass[1] | — | 900 | 900 | 900 | 900 | 900 | 900 | 900 | 900 |
| Trans-polyisoprene | g | 0 | 4 | 4 | 4 | 4 | 4 | 4 | 4 | 4 |
| Cross-linking agent | g | 0 | 0 | 0.02 | 0.06 | 0.12 | 0.18 | 0.30 | 0.42 | 0.54 |
|  | Parts by mass[1] | — | — | 0.5 | 1.5 | 3.0 | 4.5 | 7.5 | 10.5 | 13.5 |
| Antioxidant | g | — | 0.08 | 0.08 | 0.08 | 0.08 | 0.08 | 0.08 | 0.08 | 0.08 |
| Impact strength | kJ/m$^2$ | 1.5 | 3.4 | 5.1 | 7.5 | 11.0 | 17.4 | 24.4 | 25.9 | 25.5 |
| Tensile modulus | MPa | 2806 | 2451 | 2502 | 2361 | 2385 | 2294 | — | — | — |
| Biomass degree | % | 100 | 99.8 | 99.8 | 99.7 | 99.5 | 99.4 | 99.1 | 98.8 | 98.5 |

[1]Parts by mass, when a content of the trans-polyisoprene is taken as 100 parts by mass, is represented by rounding off one decimal place.

As shown in Table 2, each of the polylactic acid resin samples obtained in Examples 8 to 14 had a better impact strength than (an impact strength greater than or equal to 3.4 times as large as) that of the sample of Comparative Example 1, for which the polylactic acid was used alone, although there was not a significant difference in the biomass degree. In particular, the larger the content of the cross-linking agent, the more significant the increase in the impact strength of the obtained polylactic acid resin sample was prone to be. Meanwhile, for the sample of the Comparative Example 2, in which the cross-linking agent was not contained, some improvement in the impact strength by mixing the trans-polyisoprene with the polylactic acid was also found. However, the impact strengths of the polylactic acid resin samples obtained in the Examples 8 to 14 indicated values far larger than the result of Comparative Example 2, so that it can be seen that the polylactic acid resin samples obtained in these examples also have been improved in impact resistance.

Further, as compared with the tensile modulus (Comparative Example 1) of the sample constituted by the polylactic acid itself, the tensile modulus of each of the polylactic acid resin samples obtained in Examples 8 to 11 has not changed very much. Accordingly, it can be seen that even when the trans-polyisoprene and the cross-linking agent were added to the polylactic acid and dynamic cross-linking was performed, the resulting polylactic acid resin samples (Examples 8 to 11) have been improved in impact strength as described above, while maintaining the inherent tensile modulus characteristic of the polylactic acid as that of Comparative Example 1.

Examples 15 to 17

Polylactic acid resin samples were produced in the same manner as in Example 1 except that the amounts of the polylactic acid, the trans-polyisoprene, and the cross-linking agent used in Example 1 were changed to the amounts shown in Table 3, and the impact strength, the tensile modulus, and the biomass degree of the obtained polylactic acid resin samples were evaluated in the same manner as in Example 1 and Comparative Example 1. The obtained results are shown in Table 3, together with the results obtained in Comparative Example 1.

Comparative Example 3

A polylactic acid resin sample was produced in the same manner as in Example 1 except that the amounts of the polylactic acid and the trans-polyisoprene used in Example 1 were changed to the amounts shown in Table 3 and that the cross-linking agent was not introduced, and the impact strength, the tensile modulus, and the biomass degree of the obtained polylactic acid resin sample were evaluated in the same manner as in Example 1 and Comparative Example 1. The obtained results are shown in Table 3.

TABLE 3

|  |  | Comparative Example 1 | Comparative Example 3 | Example 15 | Example 16 | Example 17 |
|---|---|---|---|---|---|---|
| Polylactic acid | g | 40 | 28 | 28 | 28 | 28 |
|  | Parts by mass[1] | — | 233 | 233 | 233 | 233 |
| Trans-polyisoprene | g | 0 | 12 | 12 | 12 | 12 |
| Cross-linking agent | g | 0 | 0 | 0.18 | 0.54 | 0.90 |
|  | Parts by mass[1] | — | — | 1.5 | 4.5 | 7.5 |
| Antioxidant | g | — | 0.08 | 0.08 | 0.08 | 0.08 |
| Impact strength | kJ/m$^2$ | 1.5 | 3.0 | 5.1 | 35.9 | 34.9 |
| Tensile modulus | MPa | 2806 | 1558 | 1678 | — | — |
| Biomass degree | % | 100 | 99.8 | 99.4 | 98.5 | 97.6 |

[1]Parts by mass, when a content of the trans-polyisoprene is taken as 100 parts by mass, is represented by rounding off one decimal place.

As shown in Table 3, the polylactic acid resin samples obtained in Examples 15 to 17 had a better impact strength than (an impact strength greater than or equal to 3.4 times as large as) that of the sample of Comparative Example 1, for which the polylactic acid was used alone, although there was not a significant difference in the biomass degree. In particular, the larger the content of the cross-linking agent, the more significant the increase in the impact strength of the resultant polylactic acid resin sample was prone to be. Meanwhile, for the sample of Comparative Example 4, in which the cross-linking agent was not contained, some improvement in the impact strength by mixing the trans-polyisoprene with the polylactic acid was also found. However, the impact strengths of the polylactic acid resin samples obtained in Examples 15 to 17 indicated values far larger than the result of Comparative Example 3, so that it can be seen that the polylactic acid resin samples obtained in these examples also have been improved in impact resistance.

Further, as compared with the tensile modulus (Comparative Example 1) of the sample constituted by the polylactic acid itself, the tensile modulus of each of the polylactic acid resin samples obtained in Examples 15 to 17 somewhat decreased, but not to the extent that had caused a loss of the characteristics of the polylactic acid. Accordingly, it can be seen that even when the trans-polyisoprene and the cross-linking agent were added to the polylactic acid and dynamic cross-linking was performed, the resulting polylactic acid resin samples (Examples 15 to 17) have been improved in impact strength as described above, without the inherent tensile modulus characteristic of the polylactic acid as that of Comparative Example 1 being impaired.

Example 18

A polylactic acid resin sample was produced in the same manner as in Example 1 except that the amounts of the polylactic acid, the trans-polyisoprene, and the cross-linking agent used in Example 1 were changed to the amounts shown in Table 4, and the impact strength, the tensile modulus, and the biomass degree of the polylactic acid resin sample were evaluated in the same manner as in Example 1 and Comparative Example 1. The obtained results are shown in Table 4, together with the results obtained in Comparative Example 1.

Comparative Example 4

A polylactic acid resin sample was produced in the same manner as in Example 1 except that the amounts of the polylactic acid and the trans-polyisoprene used in Example 1 were changed to the amounts shown in Table 4, and that the cross-linking agent was not introduced, and the impact strength, the tensile modulus, and the biomass degree of the obtained polylactic acid resin sample were evaluated in the same manner as in Example 1 and Comparative Example 1. The obtained results are shown in Table 4.

TABLE 4

| | | Comparative Example 1 | Comparative Example 4 | Example 18 |
|---|---|---|---|---|
| Polylactic acid | g | 40 | 20 | 20 |
| | Parts by mass[1] | — | 100 | 100 |
| Trans-polyisoprene | g | 0 | 20 | 20 |
| Cross-linking agent | g | 0 | 0 | 0.30 |
| | Parts by mass[1] | — | — | 1.5 |
| Antioxidant | g | — | 0.08 | 0.08 |
| Impact strength | kJ/m$^2$ | 1.5 | 2.6 | 5.0 |
| Tensile modulus | MPa | 2806 | 1103 | 1118 |
| Biomass degree | % | 100 | 99.8 | 99.1 |

[1]Parts by mass, when a content of the trans-polyisoprene is taken as 100 parts by mass, is represented by rounding off one decimal place.

As shown in Table 4, the polylactic acid resin sample obtained in Example 18 had a better impact strength than (an impact strength greater than or equal to 3.5 times as large as) that of the sample of Comparative Example 1, for which the polylactic acid was used alone, although there was not a significant difference in the biomass degree. Meanwhile, for the sample of Comparative Example 4, in which the cross-linking agent was not contained, some impact strength by mixing the trans-polyisoprene with the polylactic acid was also found. However, the impact strength of the polylactic acid resin sample obtained in Example 18 indicated a value far larger than the result of Comparative Example 4, so that it can be seen that the polylactic acid resin sample obtained in Example 18 also has been improved in impact resistance.

Further, as compared with the tensile modulus (Comparative Example 1) of the sample constituted by the polylactic acid itself, the tensile modulus of the polylactic acid resin sample obtained in Example 18 somewhat decreased, but not to the extent that had caused a loss of the characteristics of the polylactic acid. Accordingly, it can be seen that even when the trans-polyisoprene and the cross-linking agent were added to the polylactic acid and dynamic cross-linking was performed, the resulting polylactic acid resin sample (Example 18) has been improved in impact strength as described above, without the inherent tensile modulus characteristic of the polylactic acid as that of Comparative Example 1 being significantly impaired.

(Observation of Fracture Surface of Polylactic Acid Resin Sample)

For the samples obtained in Examples 9, 11, 15 and 16, and Comparative Examples 2 and 3, first, the strip pieces produced for the Charpy impact test in the examples and the comparative examples were immersed in n-hexane at 60° C. for 120 minutes, and the fracture surfaces of the strip pieces were subjected to solvent etching to dissolve the trans-polyisoprene. Then, they were subjected to gold evaporation through sputtering, to obtain observation samples.

Thereafter, the solvent-etched surface of each of the observation samples was observed with a scanning electron microscope (manufactured by Hitachi High-Technologies Corporation/Model: Hitachi S3400-N). The obtained results are shown in FIG. 1.

According to FIG. 1, a large number of pores appearing as a result of the trans-polyisoprene having been dissolved through etching and the polylactic acid matrix present at the periphery thereof can be observed on each of the solvent-etched surfaces of the observation samples obtained from the examples and the comparative examples.

Here, it can be seen that the diameter of the pores (i.e., the particle diameter of the trans-polyisoprene that has been present) is small on the etched surfaces obtained from the samples of Examples 9 and 11, for which dynamic cross-linking was performed, as compared with that on the etched surface of the sample of Comparative Example 2, for which dynamic cross-linking was not performed. In addition, it can be seen that the diameter of the pores (i.e., the particle diameter of the trans-polyisoprene that has been present) is also small on the etched surfaces obtained from the samples of the Examples 15 and 16, for which dynamic cross-linking was performed, as compared with that on the etched surface obtained from the sample of Comparative Example 3, for which dynamic cross-linking was not performed. Further, comparisons between Examples 9, 11, 15 and 16 show that the samples (Example 15 and 16) with a higher trans-polyisoprene content are prone to have a larger diameter of the pores appearing in the etched surface, and the higher the content of the trans-polyisoprene, the larger the particle diameter of the particles of the trans-polyisoprene formed in the resulting polylactic acid resin sample. Still further, as the content of the cross-linking agent is increased so as to perform a greater amount of dynamic cross-linking on the resin sample, the particle diameter of the trans-polyisoprene is reduced (Examples 11 and 16), and on the other hand, the impact resistance of the resulting polylactic acid resin sample is enhanced, as shown in Tables 1 to 4 above. Note that, as a result of calculating and examining the radius of the pores appearing in each of the solvent-etched surfaces of Examples 9, 11, 15, and 16 shown in FIG. 1, it was found that each of the samples of Example 9, 11, 15, and 16 before being etched contained trans-polyisoprene particles having an average particle diameter within a range of at least 0.1 μm to 100 μm.

INDUSTRIAL APPLICABILITY

The present invention is useful for various resin molded articles (e.g., automobile molded articles, molded articles for electric products, molded articles for agricultural materials, molded articles for business use, and molded articles for daily use) which have been difficult to be provided by using conventional polylactic acid-based resin alone.

What is claimed is:

1. A polylactic acid resin composition constructed by dynamically cross-linking a resin mixture containing a polylactic acid-based resin, trans-polyisoprene, and a cross-linking agent.

2. The polylactic acid resin composition according to claim 1,
wherein, when a content of the trans-polyisoprene is taken as 100 parts by mass,
a content of the polylactic acid-based resin is 80 parts by mass to 2000 parts by mass, and
a content of the cross-linking agent is 0.3 parts by mass to 50 parts by mass.

3. The polylactic acid resin composition according to claim 1, wherein the cross-linking agent is an organic peroxide.

4. The polylactic acid resin composition according to claim 3, wherein the organic peroxide is at least one peroxide selected from the group consisting of 2,5-dimethyl-2,5-di(t-butylperoxy)hexane, dicumyl peroxide, and 2,5-dimethyl-2,5-di(t-butylperoxy)-3-hexyne.

5. The polylactic acid resin composition according to claim 1, wherein the trans-polyisoprene is contained in a form of particles having an average particle diameter of 0.1 μm to 100 μm.

6. A method for producing a polylactic acid resin composition, comprising:
mixing a polylactic acid-based resin, trans-polyisoprene, and a cross-linking agent to obtain a resin mixture; and
kneading the resin mixture under heating to dynamically cross-link the resin mixture.

7. The method according to claim 6, wherein the step of kneading is performed at a temperature of 80° C. to 280° C.

8. The method according to claim 6,
wherein, when a content of the trans-polyisoprene is taken as 100 parts by mass,
a content of the polylactic acid-based resin is 80 parts by mass to 2000 parts by mass, and
a content of the cross-linking agent is 0.3 parts by mass to 50 parts by mass.

9. The method according to claim 6, wherein the cross-linking agent is an organic peroxide.

10. A resin molded article containing the polylactic acid resin composition according to claim 1.

* * * * *